E. P. WOILLARD.
OZONE GENERATOR.
APPLICATION FILED OCT. 17, 1910.
994,294.
Patented June 6, 1911.
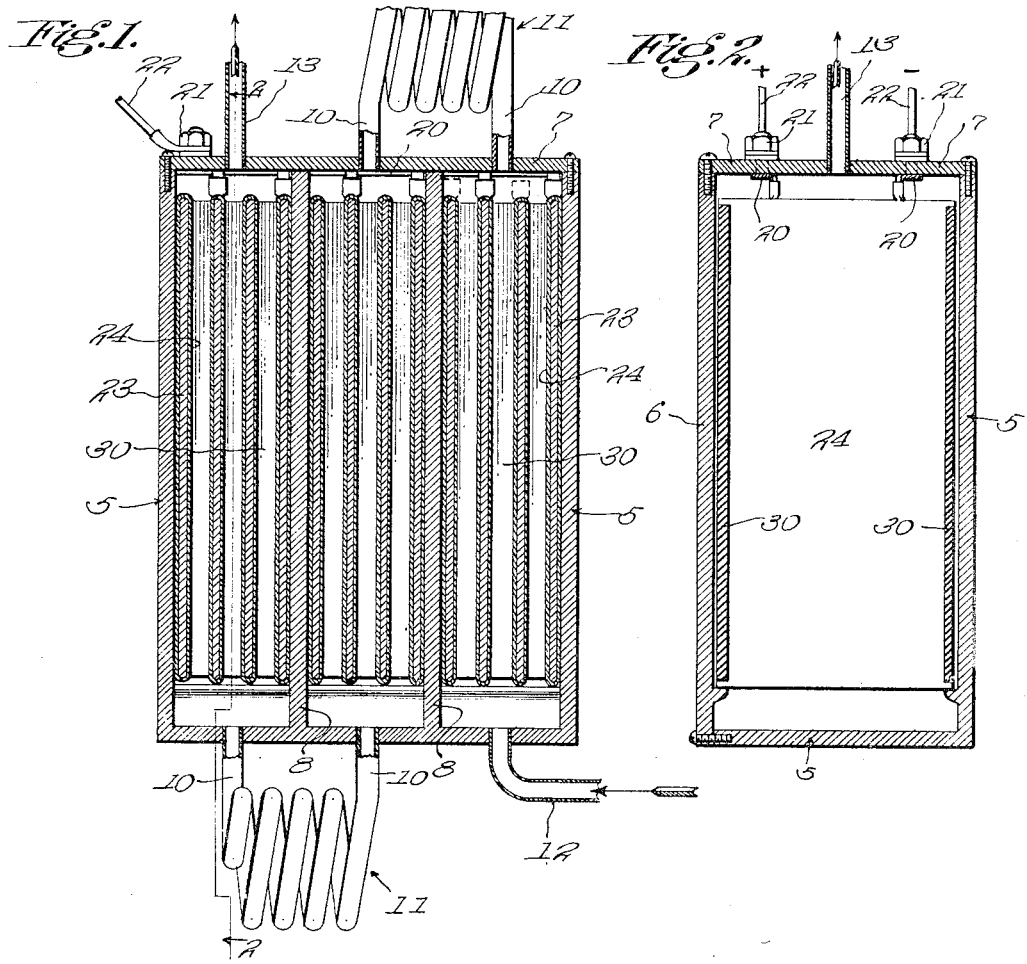
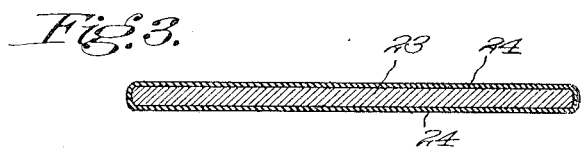
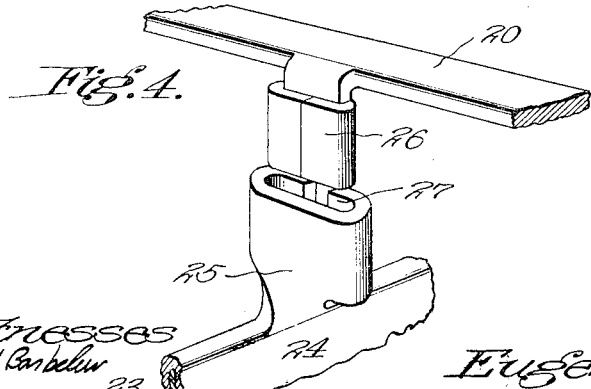
Inventor
Eugene P. Woillard
by James T. Barkelew
his Attorney.

UNITED STATES PATENT OFFICE.

EUGENE P. WOILLARD, OF LOS ANGELES, CALIFORNIA.

OZONE-GENERATOR.

994,294.   Specification of Letters Patent.   Patented June 6, 1911.

Application filed October 17, 1910. Serial No. 587,438.

*To all whom it may concern:*

Be it known that I, EUGENE P. WOILLARD, a citizen of the United States, residing at Los Angeles, in the county of Los Angeles and State of California, have invented new and useful Improvements in Ozone-Generators, of which the following is a specification.

This invention relates to a device for generating and producing ozone by a method entirely different from the methods now in general use for such purposes.

In ozone generators, as now generally used, the "silent discharge" has been utilized for the most part, this discharge consisting of a continuous passage of a very fine spark shower between the electrodes. The mechanism used usually embodies some form of concentric tube arrangement, the oxygen passing through the space between the tubes and the electrodes being situated outside the outer tube and inside the inner one. The passage of the silent discharge across the space intervening between the two electrodes gives rise to the ozonization of the oxygen in that space. The gas utilized is usually the oxygen of the atmosphere, the nitrogen and other components being also forced through the ozonizer. For ordinary use, to pass a current of pure oxygen through the machine would be far too expensive; the atmospheric gases are the cheapest possible source of ozone, but, under the action of the electric discharge, the nitrogen and oxygen are united in the form of nitrogen per oxid, $NO_2$ or $N_2O_4$. Whether the nitrogen unites directly with the oxygen, or whether the oxygen is first transformed to ozone and subsequently united with the oxygen, may be an open question; but, in whatever manner the reaction may take place, it is certain that the union of nitrogen and oxygen is caused by the electric discharge.

My invention has for its prime object the generation of ozone without the attendant generation of deleterious gases; and for a secondary object, a machine which is perfectly sanitary, durable and efficient in every respect.

Broadly my generator consists, in its simplest form, of an anode and a cathode plate spaced at sufficient distance to prevent any discharge between them. To all intents and purposes, with the exception hereinafter noted, the plates are furnished with a static charge. The electric action between them partakes more of the nature of the electrification of the gas between them, causing charged ions to pass from the cathode to the anode; or partakes of the action of the cathode rays. Since the charge is static, in the manner named, the cathode and anode may be both covered with a dielectric, the dielectric being as easily charged as the metallic plate forming the base of the anode and cathode. My anode and cathode are formed preferably of a metallic plate, for a base, coated over completely with a dielectric, for instance, glazed porcelain. By entirely covering the metal plate, the ozone is prevented from coming into contact with it and causing oxidation as would otherwise be the case. The porcelain coating is absolutely sanitary, and the sanitary qualities of the whole device are further increased by making the casing of porcelain or glass.

In my generator no artificial substances are produced except ozone, no combination of the nitrogen and oxygen taking place. Thus the product of my generator is much better suited to all therapeutic purposes, and may be used with impunity where the products of other generators could not be used at all.

There are several minor features of construction which will appear in the accompanying drawings illustrating a preferred form of my invention, in which drawings:

Figure 1 is a longitudinal section of my improved device, showing a three compartment arrangement. Fig. 2 is a cross section taken on line 2—2 of Fig. 1. Fig. 3 is an enlarged cross section of one of the terminal plates. Fig. 4 is a perspective detail showing the method of attachment of the plates to the bus bars.

In the drawings 5 designates a case of suitable proportions, being preferably provided with a removable front 6 and a removable cover 7. In the present embodiment, the case is divided into three compartments by partition walls 8, but it will be understood that any number of compartments may be used. The whole structure so far described may be made of glazed earthenware, glass, glazed metal, porcelain or any other similar sanitary substance which is not attacked by ozone. A convenient form is to have the body of the case made of porcelain and the top or top and front made of glass so that the interior may be observed. The compartments are connected together by means of tubes 10 which connect with cooling devices 11 as illustrated. A tube 12 introduces a stream of gas to one of the compartments, the gas having previously been filtered and cooled. From the first compartment the stream of partially ozonized gas passes through tubes 10 and cooler 11 to the second compartment, from whence it similarly passes to the third compartment, being finally drawn off through tube 13. It will be understood that the coolers do not enter into my invention. They are only illustrated for the reason that they are generally used. It might be practical to entirely separate the ozone from the atmospheric gases by cooling to approximately 110 degrees below zero C. in the coolers.

Arranged under the cover 7 are two bus bars 20, each being provided with a binding post 21 to which wire 22 may be connected to supply high potential electrical energy. The anode plates are all attached to one bar 20 while the cathode plates are all attached to the other bar. Equal numbers of plates are used in each compartment. The plates each consist of a metallic base 23 and a dielectric facing 24, this preferably porcelain facing completely covering base 23. At the top of each plate a tab 25 extends which is bent to the form of a clip as shown in Fig. 4 to be clamped around lug 26 projecting from bus bar 20. The inner face of the clip, as shown at 27 is not covered with the porcelain facing; neither is the outer facing of lug 26 so covered where the clip comes into engagement with it. But all other portions of the bus bar, lugs and clips are completely covered by the porcelain facing, so that, when assembled no metal will be exposed to the action of ozone.

In operation I use a high potential electric current of very small amperage, the potential being insufficient to cross the gap between adjacent plates. The plates are held apart by strips 30, made of some material which is an electric non-conductor and not attacked by ozone, and further being preferably a substance which may be wedged into place between the plates without any danger of injuring their porcelain surfacing. Bars of asbestos fulfil all of these requirements. With the plates thus spaced apart and all danger of arcing or sparking completely avoided, the oxygen between the plates is ozonized by an action of the nature hereinbefore set forth.

Having described my invention, I claim:

1. A terminal plate, comprising a metallic base, and a coating of porcelain substance deposited upon the base.

2. A terminal plate, comprising a base of an electrical conductor, and a facing of porcelain enamel for the base bonded thereto and completely covering the same.

In witness that I claim the foregoing I have hereunto subscribed my name this 11 day of October 1910.

EUGENE P. WOILLARD.

Witnesses:
JAMES T. BARKELEW,
ELWOOD H. BARKELEW.